Dec. 17, 1968  R. C. HARE  3,416,457
VANE TYPE FLUID CONVERTER
Filed July 19, 1966  5 Sheets-Sheet 1

INVENTOR
RICHARD C. HARE

BY *Robellard & Byrne*

ATTORNEYS

INVENTOR
RICHARD C. HARE

Dec. 17, 1968  R. C. HARE  3,416,457
VANE TYPE FLUID CONVERTER
Filed July 19, 1966  5 Sheets-Sheet 4
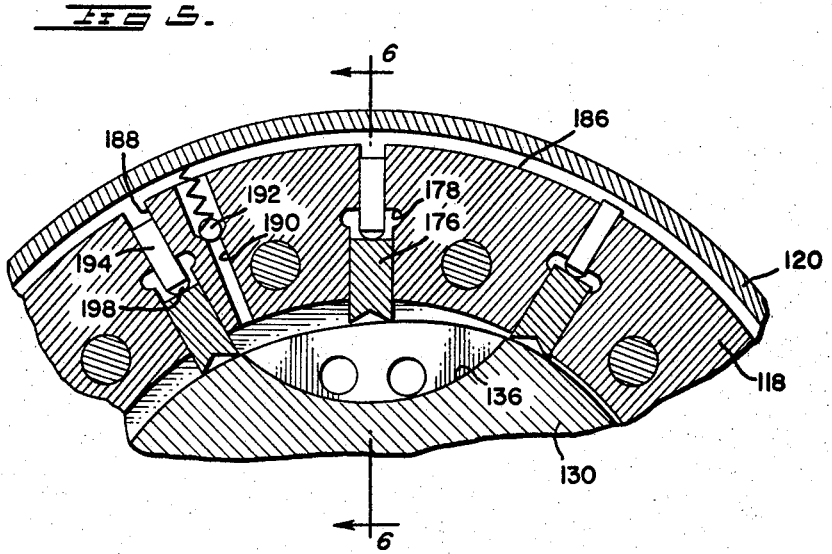
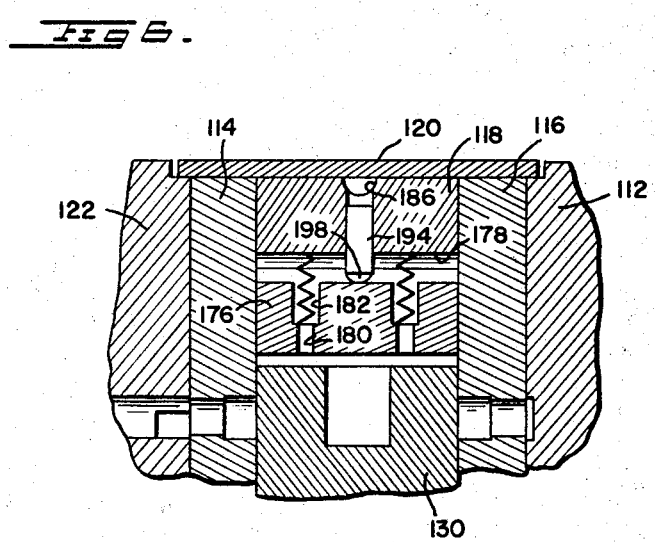
INVENTOR
RICHARD C. HARE
BY
ATTORNEYS Dec. 17, 1968                R. C. HARE                3,416,457
                       VANE TYPE FLUID CONVERTER
Filed July 19, 1966                              5 Sheets-Sheet 5
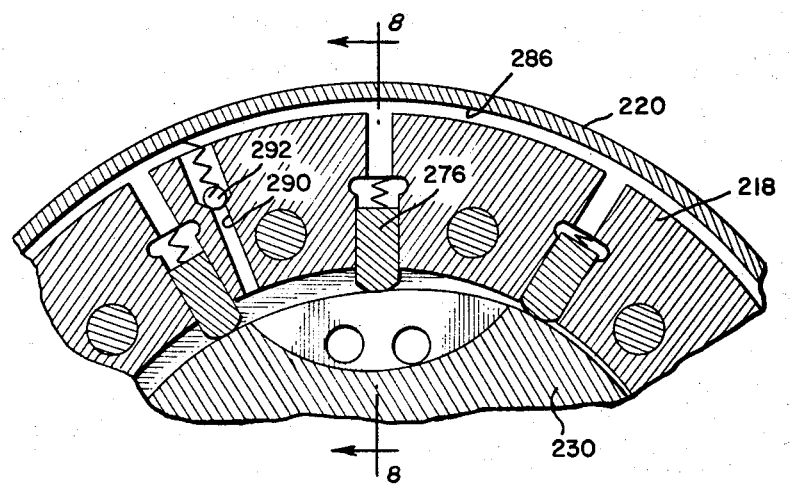
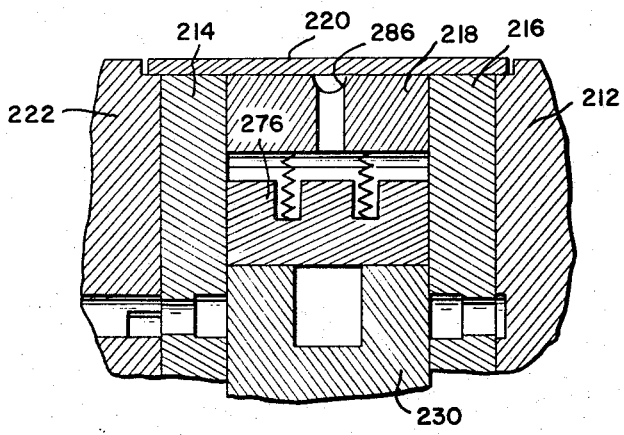
INVENTOR
RICHARD C. HARE
BY *Robelledg Byrne*
ATTORNEYS

United States Patent Office 3,416,457
Patented Dec. 17, 1968

3,416,457
VANE TYPE FLUID CONVERTER
Richard C. Hare, Wauwatosa, Wis., assignor to Applied Power Industries, Inc., Milwaukee, Wis., a corporation of Wisconsin
Filed July 19, 1966, Ser. No. 566,326
7 Claims. (Cl. 103—123)

This invention relates generally to fluid power converters and more specifically to hydraulic power converters of the vaned, expansible chamber type.

Fluid power converters type to which this invention pertains are common in the prior art. Basically these converters consist of a housing enclosing a shaft mounted rotor or rotatable member, the housing and/or the rotor being configured so that a plurality of expansible chambers are formed therebetween. This type of converter also employs vanes extending radially between the relatively rotating parts, to segregate the chambers formed therebetween.

Prior art devices, in general, accomplish communication to and from the expansible chambers through conduiting communicating with the chambers, either directly through the housing to the chambers or through the shaft and to chambers formed at the peripheral surface of the rotor, through radially extending conduits in the rotor.

Prior art structures have also utilized various means to bias the vanes into sliding and sealing contact with the opposing relatively rotating surface. These means include centrifugal force, when the vanes are mounted in the rotor and the device is being utilized as a pump, springs biasing the vanes, a fluid pressure biasing force from the converter if used as a pump or from the drive pressure source if the device is being utilized as a motor or various combinations of the above.

A problem encountered in prior art devices involves the connection between the shaft on which the rotor is mounted and the rotor itself. These connections have heretofore been keyed, splined or the like and have therefore been relatively rigid. If small misalignments are present in the shaft or the rotor, undue wear is imposed on the transverse faces of the rotor through the side forces generated by the misalignment between the parts.

Another problem experienced with prior art devices is one of sealing between the transverse surfaces of the rotor and the housing to prevent loss of fluid pressure.

It is an object of this invention to provide a fluid power converter of the type described which incorporates a novel means for transmitting fluid to and from the expansible chambers thereof.

It is another object of this invention to provide an expansible chamber fluid power converter of the type described in which novel means for biasing the vanes thereof in sealing engagement against the relatively rotating parts are provided.

It is yet another object of this invention to furnish a novel means for sealing between the transverse surfaces of the rotor and the housing in a converter of the type described by providing pressure plates biased into sealing contact with the transverse surfaces of the rotor by fluid pressure from the inlet and exhaust ports thereof.

It is still a further object of this invention to provide a wear resistant, efficient converter of the type described by furnishing means to balance the fluid pressures acting within the converter.

It is still another object of this invention to provide a novel power converter of the type described in which undue wear on the rotor is avoided by provision of a loose, splined shaft-rotor mounting to avoid undesirable side loadings caused by misalignment of the shaft and/or rotor.

It is a further object of this invention to furnish a novel fluid power converter of the type described which is more simply and economically built than similar devices heretofore available in the prior art.

These and other objects of the invention will become more readily understood by reference to the following-detailed description when viewed in light of the accompanying drawings wherein like elements throughout the figures thereof are indicated by like numerals and wherein:

FIGURE 5 is a fragmentary view in section of a fluid power converter in accordance with the invention showing a variation in the vane-biasing system thereof;

FIGURE 6 is a sectional view of the embodiment of FIGURE 4 taken along the lines 6—6 thereof;

FIGURE 7 is a view similar to FIGURE 4 showing yet another variation in the vane-biasing system for a power converter in accordance with the invention; and FIGURE 8 is a sectional view of the embodiment of FIGURE 6 taken along the lines 8—8 thereof.

Figure 1:
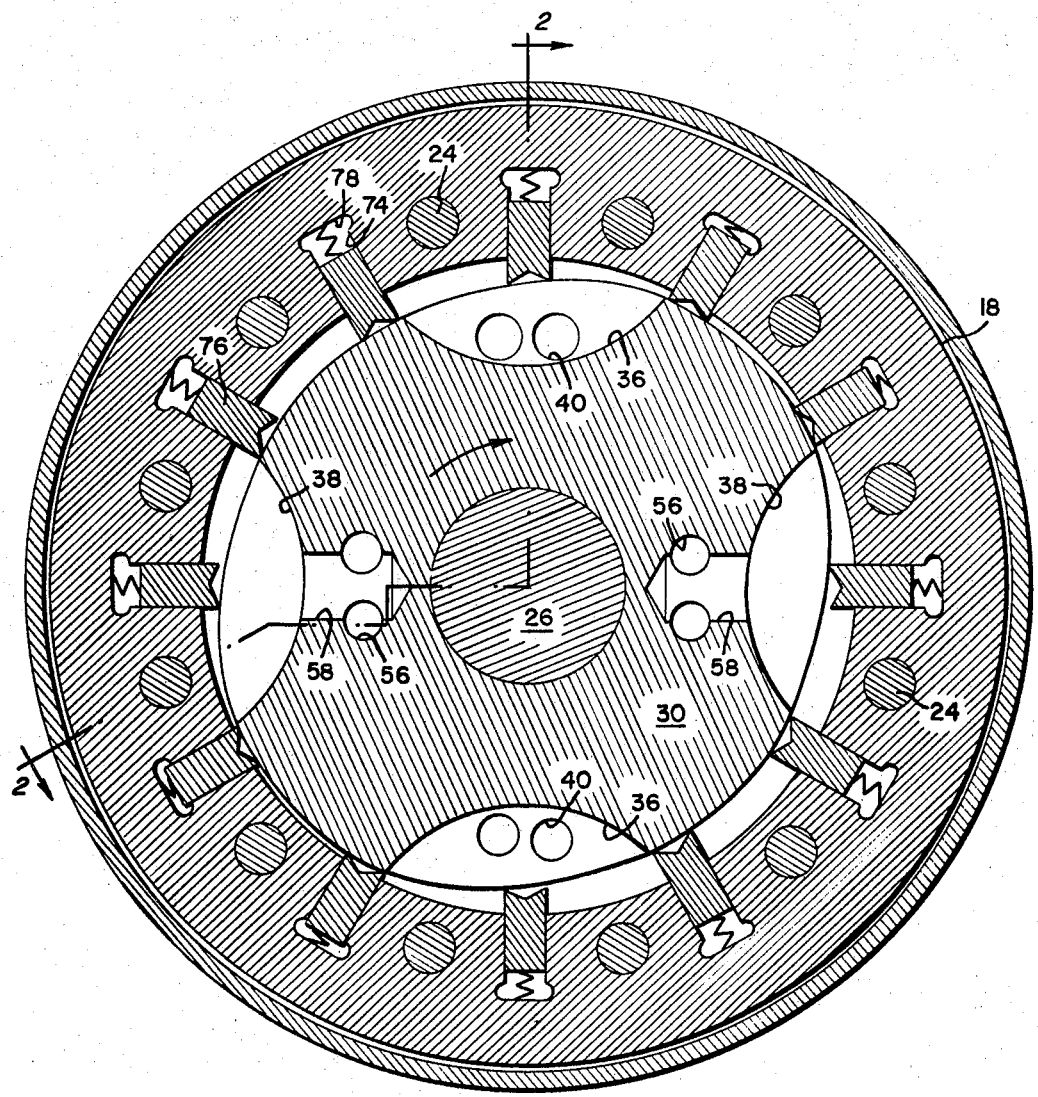
FIGURE 1 is a side elevational view of the converter of FIGURE 1 power converter in accordance with the invention.
Figure 2:
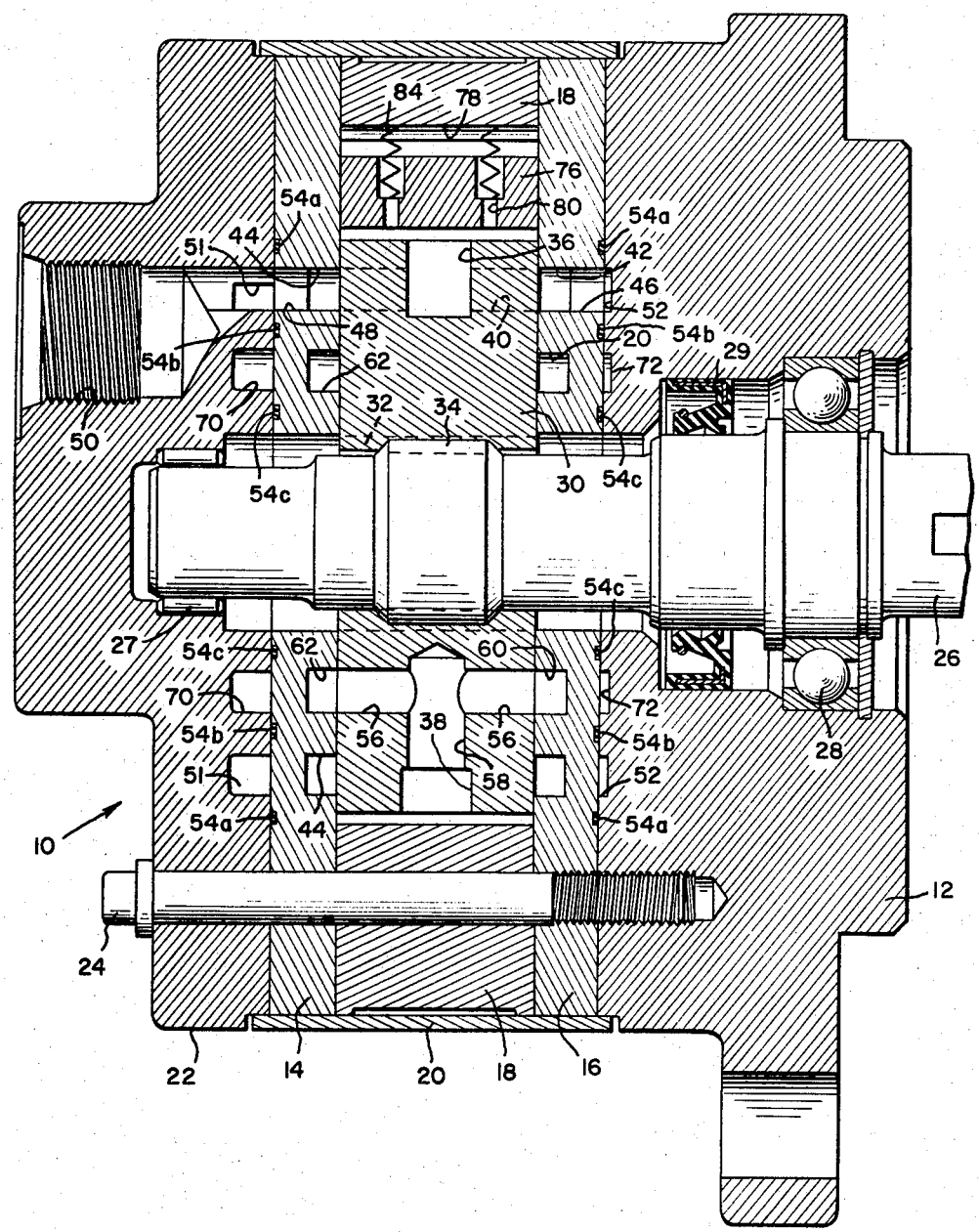
FIGURE 2 is a sectional view of the converter of FIGURE 1 taken along the lines 2—2 thereof.

Turning now to FIGURES 1 and 2 of the drawings for more complete understanding of the invention, a fluid power converter in accordance with the invention is shown in sectional elevation and side view respectively. Although the converter is specifically described hereinafter as a hydraulic motor operated by hydraulic fluid under pressure, it should be understood that the structure described is equally adapted for use as a hydraulic pump with the power input thereto in the form mechanical rotation of the shaft. The device comprises a housing shown generally at 10 which is made up of a forebody 12, a first and second pressure compensating plate 14 and 16 respectively sandwiching therebetween an annular mid-portion 18. An aligning ring 20 encases the pressure compensating plates 14 and 16 and the mid-portion 18 disposed therearound. An end plate 22 abuts the first pressure compensating plate 14 and the aforedescribed components are connected together by a series of bolts 24 disposed through bores axially aligned therethrough and threaded into a tapped bore in the forebody 12.

A shaft 26, extending through a bore 27 in the forebody 12, is rotatably supported in the housing 10 by bearings 28 and 30 mounted in the end plate 22 and forebody respectively. An elastomeric seal 29, disposed in the bore 27 around the shaft 26, provides a seal between bore and shaft.

A rotor 30 is mounted on the shaft 26 by means of internal splines 32 loosely interfitting external splines 34 on the shaft. A pair of semi-circular inlet recesses 36 are formed in the outer periphery of the rotor 30 in 180° spaced relationship to one another while a pair of exhaust outlet recesses 38 are similarly disposed in the periphery of the rotor 30 in 90° spaced relationship to the inlet recesses 36.

As can best be seen by reference to FIGURE 1, the chamber formed by the housing or the mid-portion 18 is cylindrical and is coaxially disposed with respect to the axis of the shaft 26. The peripheral surfaces of the rotor 30 are cam shaped or of varying radius, defining a continuous oblong periphery thereto so that chambers which vary in volume as the rotor rotates are formed between the periphery of the rotor and the internal surface of the mid-portion 18. Structure providing varying volume in chambers defined between a rotor and a housing such as that described above is known in the art and variations thereon, such, for example, as a cylindrical or circular rotor operating in an oblong or non-circular cavity could obviously be incorporated in this device to provide the varying volume chambers within the scope of the teachings of this invention.

In a vane pump of this type, the inlet and exhaust portion has to be associated with the member that contains the cam shape. In this instance, the porting has to be in the rotor because the rotor carries the cam contour. The inlet recesses 36 are provided with inlet conduits 40 communicating therewith and extending therefrom through the rotor 30 to the transverse faces thereof. Annular grooves 44 and 42, formed in the rotor-abutting faces of the first and second pressure compensating plates 14 and 16, are disposed at a radius equal to that of the radial disposition of the conduits 40. The pressure compensating plates are provided with arcuate slots or passages 48 and 46 extending axially therethrough in communication with the grooves 44 and 42. The end plate 22 is provided with a tapped inlet bore 50 which communicates, through annular groove 51, with the slot 48. An annular groove 52 in the face of the forebody 12 which abuts the pressure compensating plate 16 communicates with the slot 46 in that plate. O-rings 54a and 54b suitably disposed in annular grooves in the end plate and forebody abutting surfaces of the pressure compensating plates and the forebody 12 and end plate 22 provide a fluid seal at these points.

Outlet conduits 56 extending axially through the rotor 30, communicate with a radially disposed bore 58 which, in turn, communicate with the exhaust outlet recesses 38. The bores 56 are disposed on a different radius from that of the inlet bores 40 for purposes described below. Annular outlet grooves 62 and 60 are formed in the rotor abutting surfaces of the pressure compensating plates 14 and 16 respectively on a radius coincident with that of the bores 56. Aligned arcuate outlet slots or passages 66 and 64 (FIGURE 3) are provided through the pressure compensating plates 14 and 16 in communication with the grooves 60 and 62 respectively. It should be noted that the slot 64 is not specifically shown in any of the figures of the drawing due to its alignment with slot 66 in FIGURE 3 and its particular disposition in the remaining figures. Slot 64 is, however, disposed with relation to slot 66 in an identical manner to the relationship between slot 46 and 48 described above and clearly shown in FIGURE 2.

An outlet port 68 (FIGURE 3) formed in the end plate 22, communicates with the slot 66 and an annular channel groove 70 in the pressure compensating plate abutting surface of the end plate 22. The slot 64 communicates with an annular groove 72 formed in the pressure-compensating-plate abutting surface of the forebody 12. An annular O-ring 54c, suitably disposed in an annular groove formed in the end plate and forebody abutting surfaces of the pressure compensating plates in conjunction with the O-ring 54b provides a fluid seal for the grooves 70 and 72 at the interface between the aforementioned structures.

Referring now more particularly to FIGURE 1, the mid-portion 18 of the housing is formed with a plurality of radially extending slots 74 disposed in uniformly spaced relationship in the inner surface thereof. Each slot 74 slidably supports a vane 76 therein and is provided with an enlarged chamber portion 78 formed at the bottom thereof. With reference to FIGURE 2 it can be seen that the vanes 76 are provided with a pair of radial bores 80 extending therethrough which bores provide communication between the peripheral surface of the rotor 30 and the enlarged chamber 78 at the bottom of the slot 74. Each of the bores is provided with a counter bore 82 at the end thereof most proximate the chamber 78. A compression spring 84 is mounted in the counter bore 82 and engages the bottom wall of the chamber 78 to bias the vane 76 in sealing abutment against peripheral surface of the rotor 30. The bores 80 and the chamber 78 provide a source of fluid pressure acting on the vane to balance the fluid pressure acting to force the vane from engagement with the rotor 30 so that the force biasing the vane into contact with the rotor is essentially that of the spring 84.

In operation, the motor is connected to a source of fluid pressure through the inlet bore 50 and to tank through the outlet bore 68. Hydraulic fluid under pressure is then directed through the inlet bore 50 into the annular groove 51 in the end plate 22 and through the slot 48 to the annular groove 44 in the pressure compensating plate 14. The conduits 40 in the rotor 30 are thereby in constant communication with the pressure source through the annular grooves 44 regardless of their rotational displacement and pressurized hydraulic fluid is in communication with the inlet recess 36 at all times. Fluid pressure is also communicated to the annular groove 42 in the pressure compensating plate 16 through the conduits 40. The annular groove 52 in the forebody 12 is in communication with the pressure source through the slot 46. The primary function of the annular groove 42 is to provide a balanced pressure against fluid in the groove 44 so that undesirable asymmetrical or side loads will not be imposed on the rotor 30. The function of the annular grooves 51 and 52 is to provide a balanced biasing force corresponding to the pressure imposed on the device between the pressure compensating plates 14 and 16 and the rotor 30 to provide suitable sealing engagement therebetween.

Figure 3:
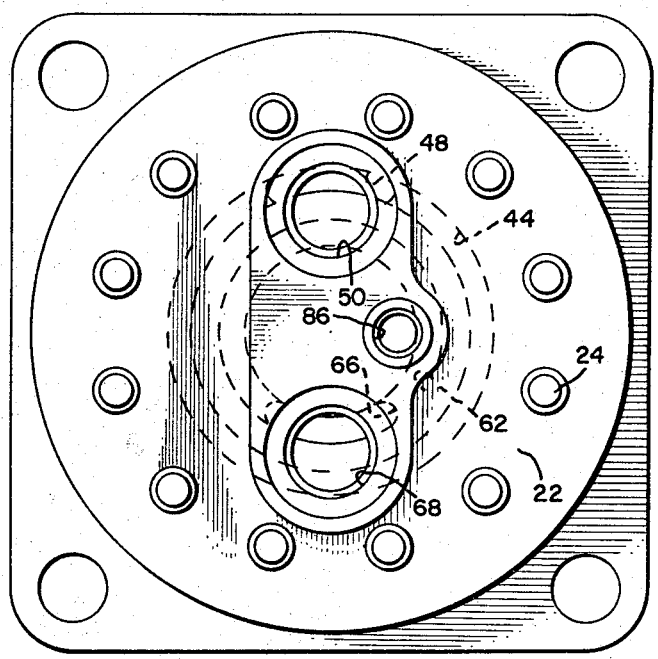
FIGURE 3 is a reduced end view of the converter of FIGURE 1.
Figure 4:
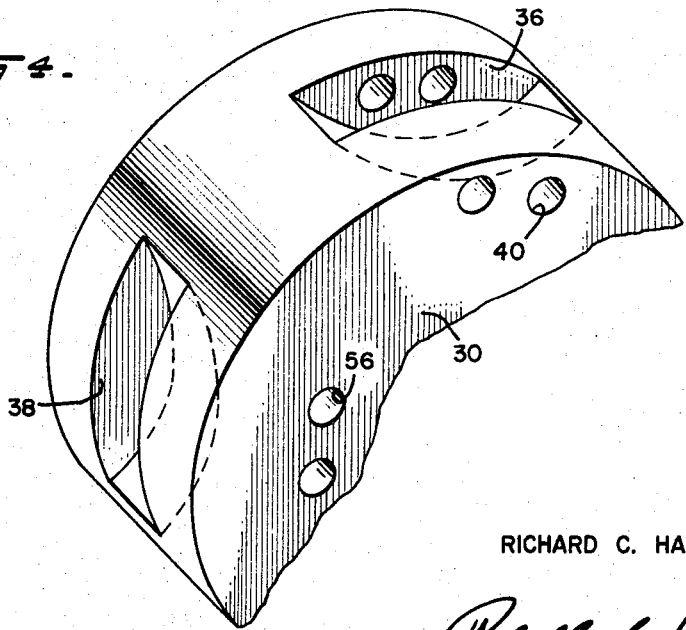
FIGURE 4 is a fragmentary perspective view of a portion of the converter of FIGURE 1.

Referring now specifically to FIGURE 1, it will be seen that, with pressure directed to the inlet recess 36 and by segregating the chamber formed between the rotor 30 and the mid-portion 18 with the vanes at the forward and trailing edges thereof, the asymmetrical configuration of the chamber defined by the recess 36 in the periphery of the rotor 30 and the vanes will cause an unbalanced pressure condition to exist therein and the fluid will thereby exert a force to rotate the rotor 30 in the direction indicated by the arrow. The above described reaction is well known in the art of expansible chamber motors of this type. As the chamber is effectively enlarged, due to the rotation of the rotor, the hydraulic fluid therein decreases in pressure and is sequentially trapped between the trailing vane intermediate vane as the inlet recess 36 rotates and passed on to the following outlet recess 38. As fluid enters the recess 38, it is exhausted through the outlet conduits 56, grooves 62 and ultimately to the outlet port 68 (FIGURE 3). The annular groove structure and slot configuration described for the outlet portion of the device is substantially identical and operates in the same manner for the same purposes as was described for the structure relating to the inlet portion of the device. Hydraulic fluid leaking from the interface between the rotor 30 and the pressure compensating plates 14 and 16, will drain into the bore surrounding the shaft 26 and is exhausted from the motor through a leakage port 86 (FIGURE 3) provided in the end plate 22 in communication with the bore.

In FIGURES 5 and 6, a variation of the fluid power converter in accordance with the invention is illustrated, components thereof corresponding to like components in the aforedescribed embodiment being indicated by like numerals of the next higher order. The primary distinction of the embodiment of FIGURES 5 and 6 lies in the means biasing the vanes 176 into contact with the rotor 130. As in the aforedescribed version, the vanes 176 are provided with a pair of bores 180 through which fluid pressure from the recess 136 is directed to the enlarged portion 178 of the slots in which the vanes ride. An additional bias, above and beyond the substantially biased balance condition provided by the fluid above and below the vanes and the springs 184, as in the aforedescribed embodiment is provided in the embodiment of FIGURES 5 and 6. In addition to the above structure, a channel 186 is formed around the periphery of the mid-portion 118 and is enclosed by the aligning ring 120 to form a circular passage. A plurality of cylinders 188, extend radially inwardly from the passage 186 and communicate with the enlarged chamber portions 178 in each of the slots 174. Communication between the passage 186 and thereby to the cylinders 188 and the working fluid, is provided by a radially extending conduit 190 through the mid-portion 118 which communicates with the inner portion thereof and the channel. A check valve 192 is disposed in an enlarged portion of the conduit 190 to block reverse flow between the passage 186 and the inner periphery of the mid-portion 118. The device should include at least two of these check valves disposed so that at least one is exposed to a pressure chamber at any given time. A piston 194, slidably disposed in the cylinders 188, engages the outer surface of each of the vanes 176. The face of the piston 194 engaging the vane 176 is in the form of a rounded or spherical surface 192 to provide substantially point contact therebetween thereby transmitting force through the piston while providing a suitably exposed surface at the upper portion of the vane 176 upon which pressure of the fluid in the enlarged chamber 178 may act.

The operation of the aforedescribed structure is essentially the same as that described above for the embodiments of FIGURES 1 through 4 with the exception that, in addition to the balancing forces provided by the fluid in enlarged chamber portion 178 and the spring biasing forces provided by the compression springs 184, an additional biasing force on the vanes 176 is mechanically imposed through the piston 194 from the fluid in the passage 186. The structure of FIGURES 5 and 6 thereby provide additional biasing forces for the vanes, which additional force is a function of the total pressure existing in the housing.

In FIGURES 7 and 8, a further variation of the vane biasing structure is illustrated, parts of the structure illustrated therein corresponding to like components of the aforedescribed structures being indicated by like numerals of the next higher order. In this embodiment, the fluid balancing forces of the aforedescribed embodiments are eliminated and a fluid pressure directed through the bore 290 and to the passage 286 is imposed directly upon the vane 276 to provide a force biasing the vane against the periphery of the rotor 230.

As can be seen in the latter-described embodiment, the cross sectional configuration of the vanes 276 may be varied, as desired, to provide the required contact between the periphery of the rotor 230 and the vane. In the latter-mentioned embodiments, this surface is configured in a cylindrical fashion so that contact between the vane and the rotor 230 is essentially linear.

What has been set forth above is intended as exemplary of teachings in accordance with the invention to enable those skilled in the art in the practice thereof. It should, therefore, be understood that, within the scope of the appended claims, the invention may be practiced other than as specifically described.

What is new and therefore desired to be protected by Letters Patent of the United States is:

1. In a fluid power converter of the type having a shaft mounted rotor rotating in a housing and radially extending vanes between the housing and the rotor to provide a plurality of expansible chambers therebetween, the improvement comprising:

inlet and outlet bores disposed through said housing, a first and second annular groove of equal radii and coaxial with the shaft disposed on the inner wall of said housing on either side of the rotor, said first groove being in communication with said inlet bore, a third and fourth annular groove of equal radii and coaxial with the shaft disposed on the inner wall of said housing on either side of the rotor, said third and fourth grooves being of different radius than that of said first and second grooves, said third groove being in communication with said outlet bore;

at least one inlet recess disposed in the periphery of said rotor, at least one inlet conduit formed through said rotor communicating with said inlet recess and the surface of the rotor at points coincident with said first and second grooves to maintain continuous communication therebetween; and at least one outlet recess formed in the periphery of said rotor, at least one outlet conduit formed through said rotor communicating with said outlet recess and the surface of the rotor at points coincident with said third and fourth grooves to maintain continuous communication therebetween.

2. A device in accordance with claim 1 wherein said housing further comprises:

a first and second annular flat plate abutting the transverse surfaces of the rotor and at least coextensive with the transverse surfaces thereof, said first plate having said first and third annular grooves formed in the rotor abutting surface thereof, said second plate having said second and fourth annular grooves formed in the rotor abutting surface thereof, an end plate and annular forebody sandwiching said flat plates therebetween said end plate having, said inlet and outlet bores formed therein;

a first passage through said first plate communicative with said first groove and said inlet bore, a second passage through said first plate communicative with said third groove and said outlet bore;

channeling means between said first and second plates and said end plate and forebody respectively to symmetrically distribute fluid at the pressure of the inlet and the outlet bores therebetwen.

3. A device in accordance with claim 2 wherein said channeling means comprises a fifth and sixth annular groove of radius equal to said first groove disposed in the plate abutting surfaces of said end plate and forebody respectively, said fifth groove being in communication with said first passage, a third passage through said second plate communicative with said second and sixth grooves;

and a seventh and eighth annular groove of radii equal to said third groove disposed in the plate abutting surface of said end plate and forebody respectively, said seventh groove being in communication with said second passage, and a fourth passage in said second plate communicative with said fourth and eighth grooves.

4. A device in accordance with claim 1 wherein said housing comprises in succession:

an end plate, a mid portion and a forebody, said mid portion having a plurality of radially extending longitudinal slots therein, a vane movably disposed in each of said slots, and means to bias said vane into sliding engagement with the peripheral surface of said rotor.

5. A device in accordance with claim 4 wherein said biasing means comprises at least one bore extending in a radial direction through said vane, and at least one spring disposed between said vane and the bottom of said slot.

6. A device in accordance with claim 5 wherein said biasing means further comprise a fluid transmitting conduit radially disposed in said mid portion, a circular passage disposed around said mid portion proximate the outer periphery thereof and communicative with said conduit, at least two check valves in said fluid transmitting passage disposed to block flow from said circular passage to the interior of said housing, a cylinder between said circular passage and the bottom of each of said slots and a piston disposed in each of said cylinders to engage said vanes, the vane-engaging end of said piston having a spherical contour thereto.

7. A device in accordance with claim 4 wherein said biasing means comprises radially disposed fluid transmitting conduit through said mid portion, a circular passage disposed aroud said mid portion proximate the outer periphery thereof and in communication with said fluid transmitting conduit, a check valve in said fluid transmitting conduit to block flow from said circular passage to the interior of said housing, and a radially disposed bore providing communication between said circular passage and the bottom of each of said slots.

References Cited

UNITED STATES PATENTS

| 167,489 | 9/1875 | Adams | 103—123 |
| 992,096 | 5/1911 | Wright et al. | 123—14 |
| 1,280,915 | 10/1918 | Weidenbach | 123—14 |
| 2,507,151 | 5/1950 | Gabriel | 91—105 |
| 2,619,040 | 11/1952 | Maisch | 103—126 |
| 2,842,006 | 7/1958 | Edman | 103—126 |
| 2,880,676 | 4/1959 | Succop | 103—126 |
| 3,175,469 | 3/1965 | Kee | 91—104 |

FOREIGN PATENTS 927,295   5/1963   Great Britain.

FRED C. MATTERN, JR., *Primary Examiner.*

WILBUR J. GOODLIN, *Assistant Examiner.*